Sept. 30, 1947.    K. F. GALLIMORE    2,428,309
BORING MACHINE
Filed March 15, 1945    10 Sheets-Sheet 2

INVENTOR
Keith F. Gallimore
By Carlson, Pitzner, Hubbard & Wolfe
ATTORNEYS

Sept. 30, 1947.   K. F. GALLIMORE   2,428,309
BORING MACHINE
Filed March 15, 1945   10 Sheets-Sheet 3
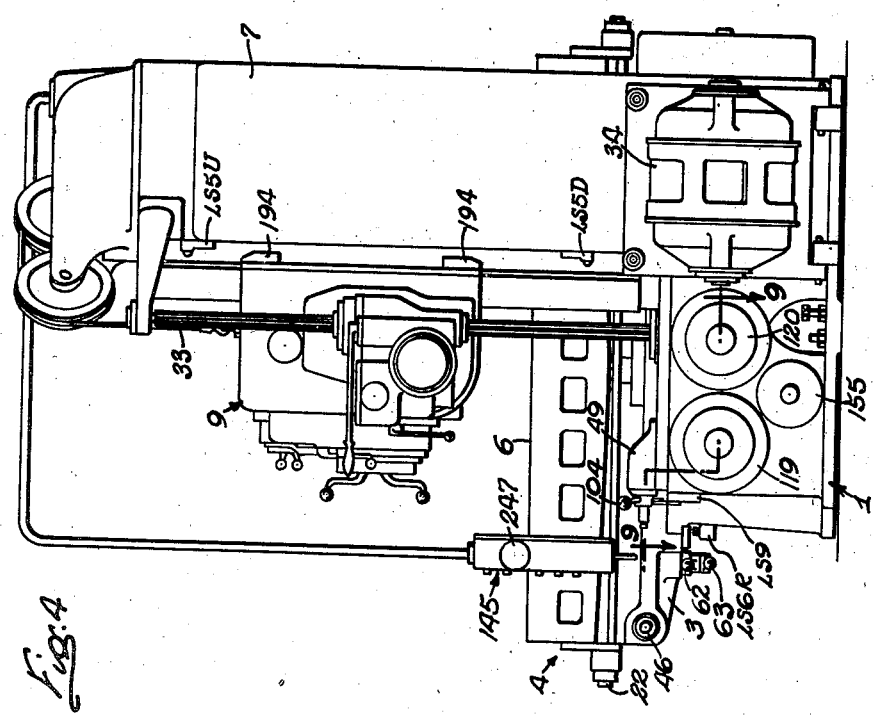
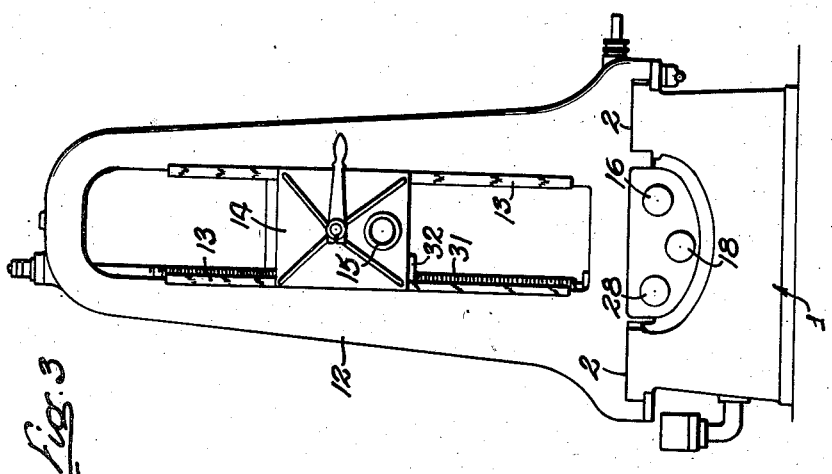
INVENTOR
Keith F. Gallimore
By Carlson, Pitzner, Hubbs & Wolfe
ATTORNEYS

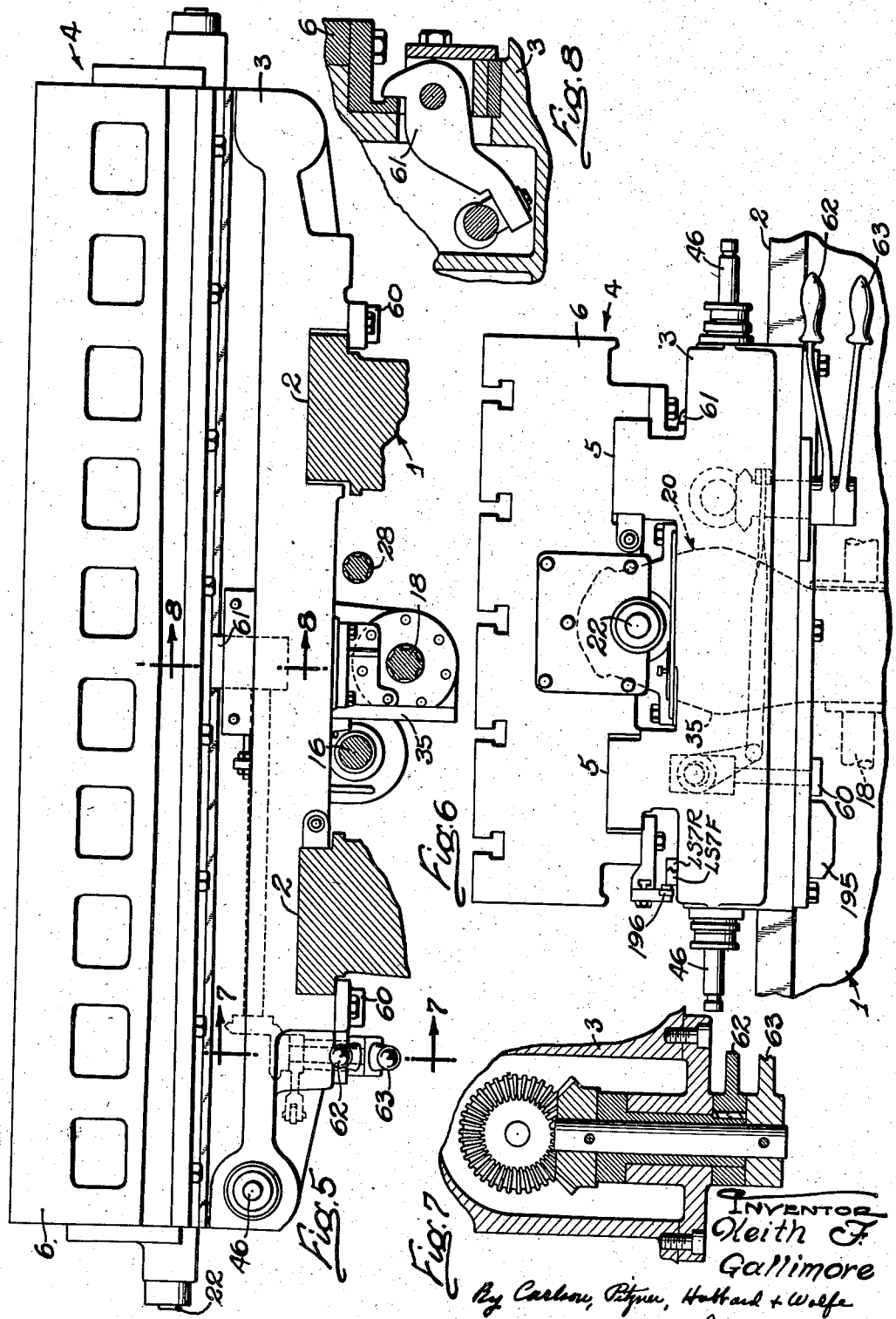

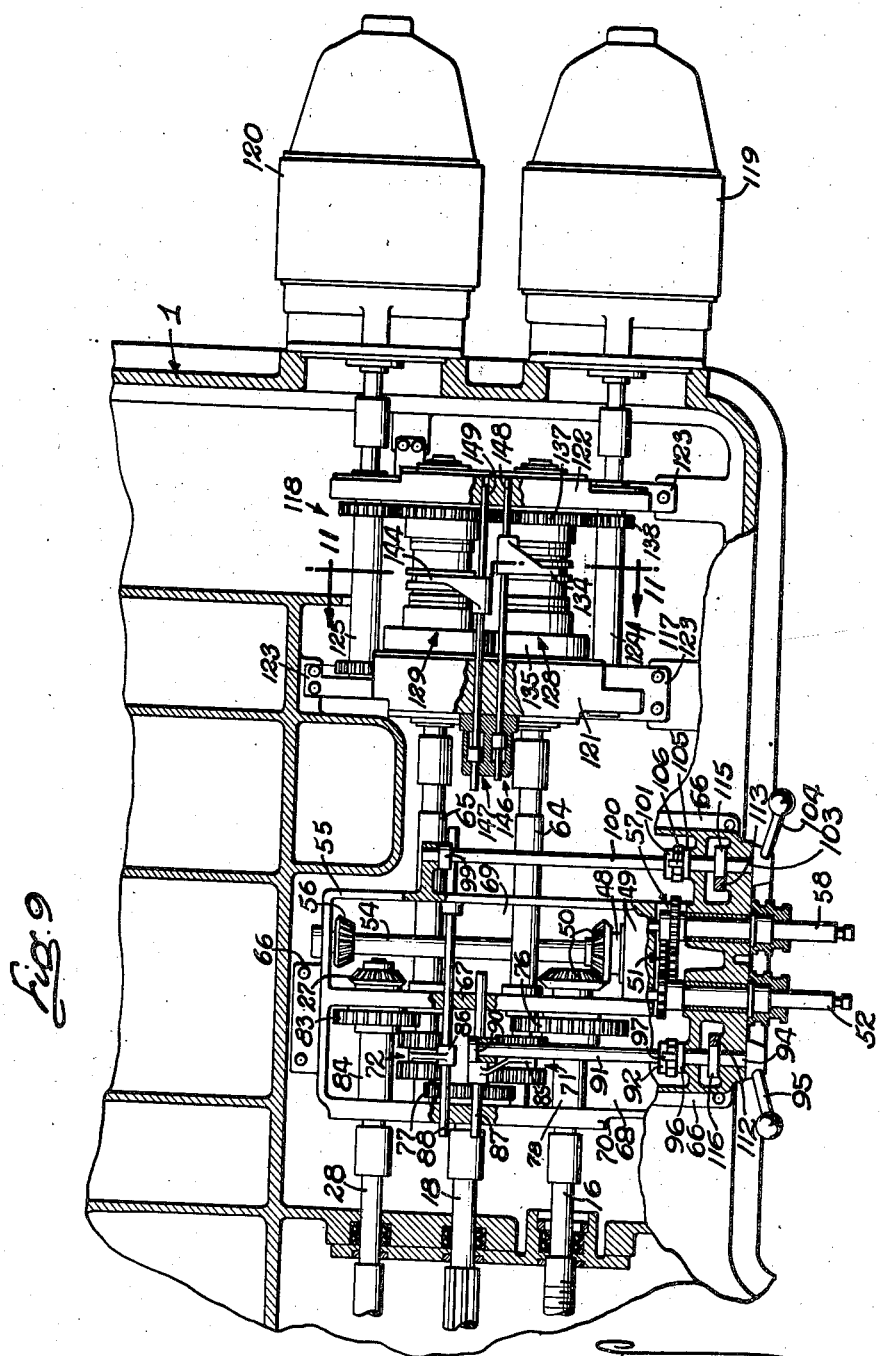

Sept. 30, 1947. K. F. GALLIMORE 2,428,309
BORING MACHINE
Filed March 15, 1945 10 Sheets-Sheet 6
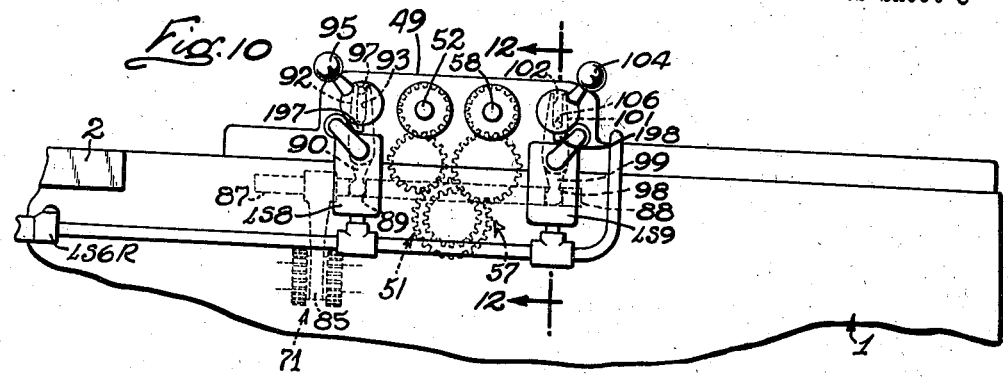
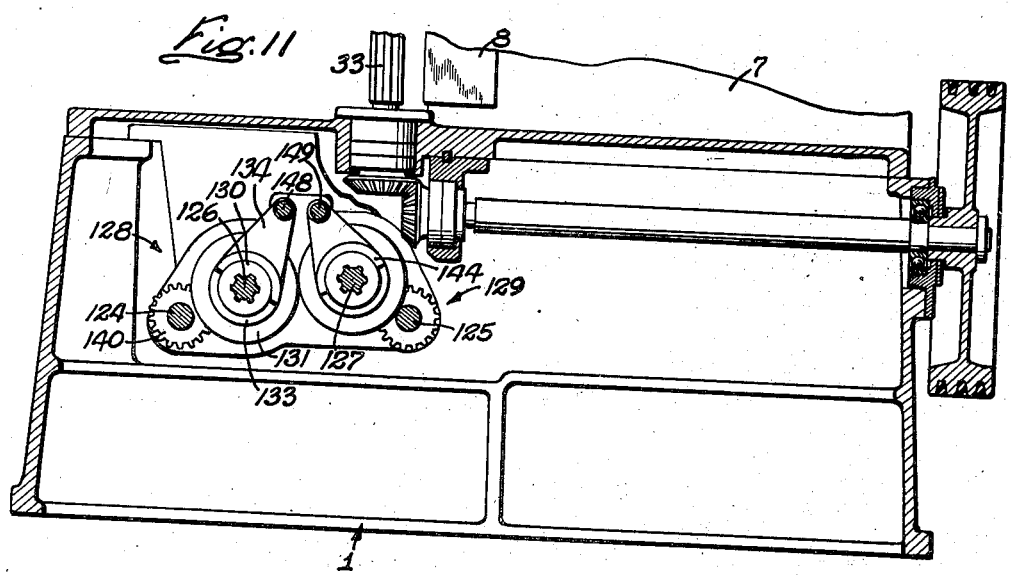
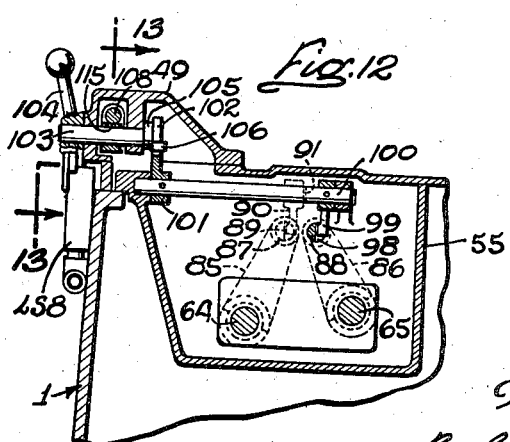
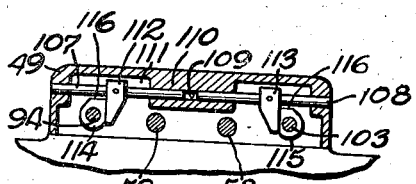
INVENTOR
Keith F. Gallimore
By Carlson, Pitzner, Hubbard & Wolfe
ATTORNEYS Sept. 30, 1947.　　　　K. F. GALLIMORE　　　　2,428,309
BORING MACHINE
Filed March 15, 1945　　　10 Sheets-Sheet 7

INVENTOR
Keith F. Gallimore
By Carlson, Pitzner, Hubbard & Wolfe
ATTORNEYS

Sept. 30, 1947. K. F. GALLIMORE 2,428,309
BORING MACHINE
Filed March 15, 1945 10 Sheets-Sheet 8
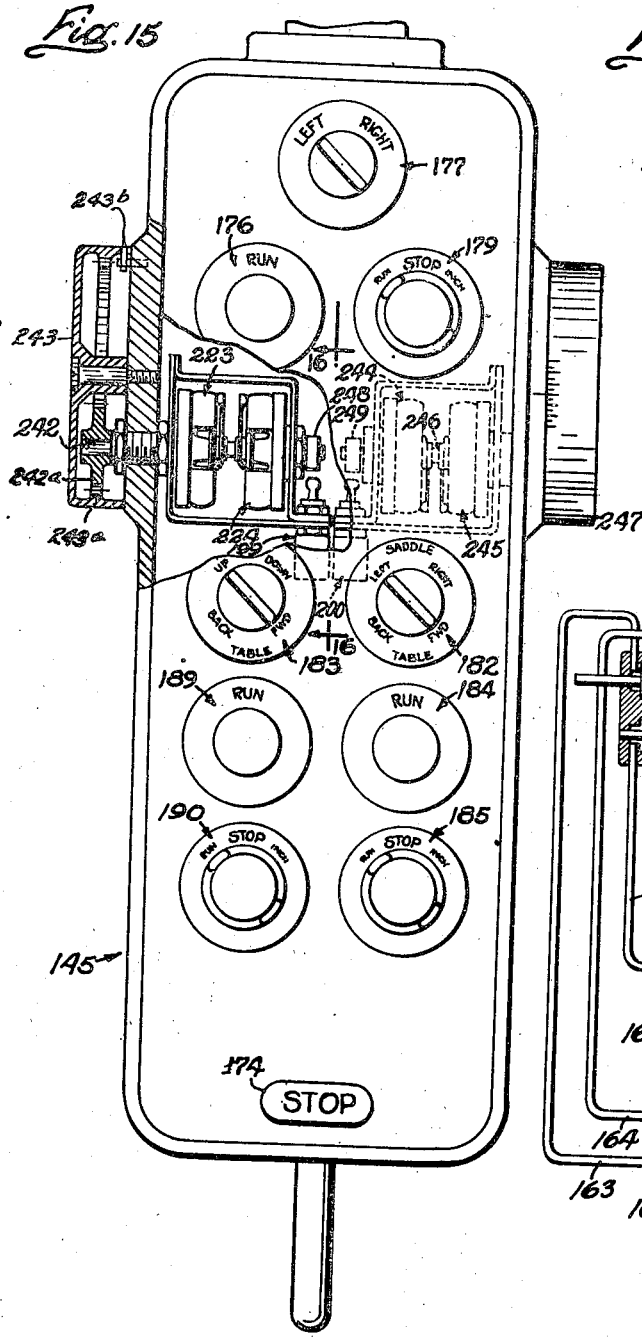
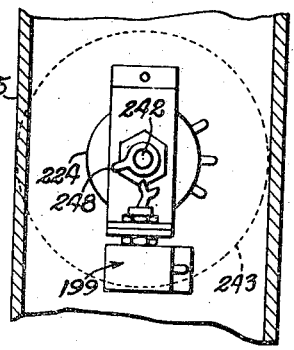
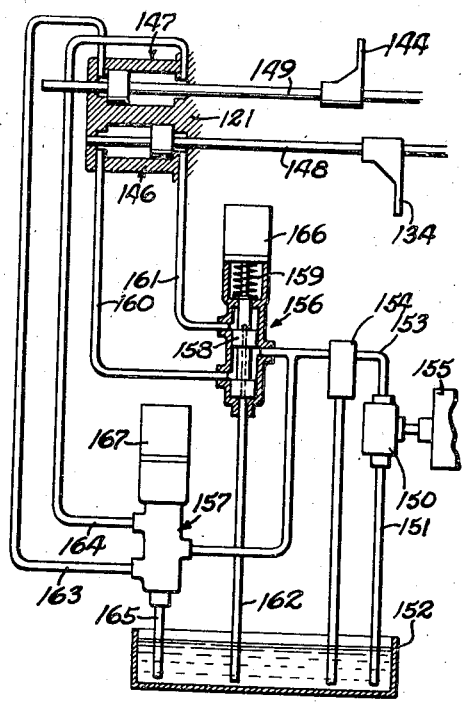
INVENTOR
Keith F Gallimore
By Carlson, Pitzner, Hubbard & Wolfe
ATTORNEYS

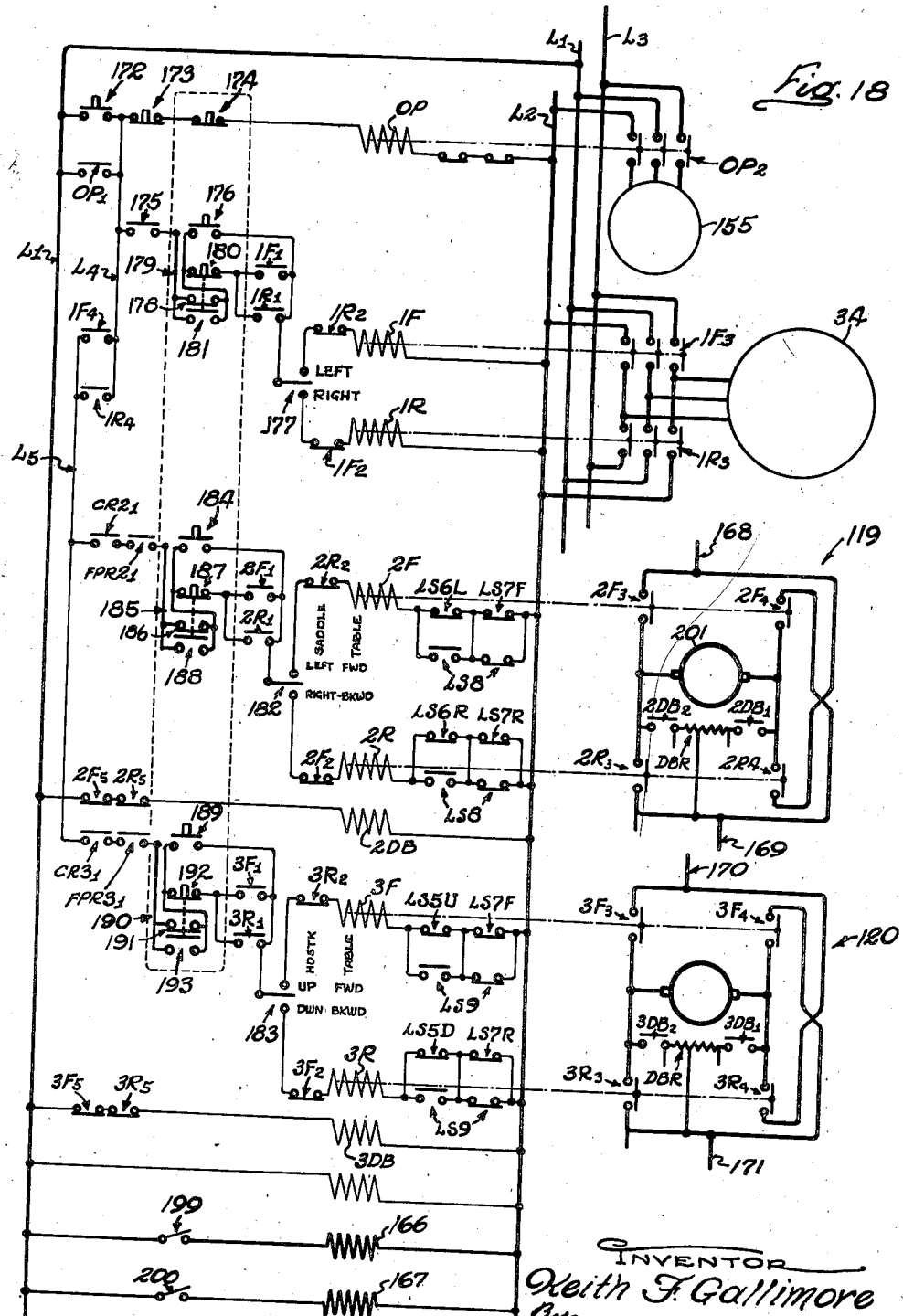

Sept. 30, 1947.　　　　K. F. GALLIMORE　　　　2,428,309
BORING MACHINE
Filed March 15, 1945　　　　10 Sheets-Sheet 10

INVENTOR
Keith F. Gallimore
By
Carlson, Pitzner, Hubbard & Wolfe
ATTORNEYS

Patented Sept. 30, 1947

2,428,309

UNITED STATES PATENT OFFICE 2,428,309

BORING MACHINE

Keith F. Gallimore, Fond du Lac, Wis., assignor to Giddings & Lewis Machine Tool Co., Fond du Lac, Wis., a corporation of Wisconsin Application March 15, 1945, Serial No. 582,910

20 Claims. (Cl. 77—3)

The present invention relates generally to improvements in boring machines, and has particular reference to machines of the type commonly known as horizontal, boring, drilling and milling machines.

One of the objects of the present invention is to provide, in a horizontal boring, drilling and milling machine, a novel drive for the main conventional operating units, i. e., the work saddle, the work table and the spindle headstock, which has a greatly improved versatility and flexibility in operation, and which more particularly is adaptable to effect selective operation of the units either individually or in various combinations, whereby to enlarge the variety of machine operations that can be performed and to increase the general usefulness of the machine.

Another object is to provide a new and improved feed drive which comprises two reversible variable-speed drive motors operable selectively to translate the three main units either individually or in combinations of two, and independently in either direction and at varying feed rates, one motor selectively serving the table and the headstock, and the other motor selectively serving the saddle and the table. As a result, each of the units may be operated with complete independence of movement as to direction and rate, either individually or jointly with any one of the other two units so as to obtain all of the motions required for the various cutting operations to be performed by the machine.

A further object is to provide a new and improved feed drive which affords a much wider feed range and a much greater number of feed changes than has been attainable heretofore in conventional drives utilizing feed-change gearing.

Another object is to provide a novel feed drive which avoids the use of complicated feed-change gear boxes and gear shifting devices, with their inherent limitations as to the available range and number of feed changes, and which specifically comprises a reversible variable-speed electric drive motor having a wide speed range, and a selective high and low speed mechanical transmission between the motor and the unit to be driven multiplying the motor range, whereby the feed drive may be reversed merely by reversing the motor, and the feed rate may be varied over a finely graduated and greatly increased range merely by varying the speed of the motor and adjusting the two-speed transmission.

A further object is to provide a novel arrangement of feed drives whereby the saddle, table and headstock units can be operated individually or in combinations of two independently in direction and feed rate, and subject to independent selection and adjustment from a centralized control station. Various other objects are to provide a novel arrangement of gearing and limit switches for predetermining the selection and limiting the extent of travel of the various units, and of interlock means for preventing improper functioning of the machine.

Further objects and advantages will become apparent as the description proceeds.

In the accompanying drawings,

Fig. 3 is a left end view.

Fig. 4 is a right end view.

Fig. 5 is a fragmentary transverse vertical sectional view taken along line 5—5 of Fig. 1, and illustrating the work support inside elevation.

Fig. 6 is a fragmentary front end elevational view of the work support.

Figs. 7 and 8 are fragmentary detailed sectional views taken respectively along lines 7—7 and 8—8 of Fig. 5, and illustrating clamping means for the work support.

Fig. 9 is a fragmentary horizontal sectional view of the feed transmission taken substantially along line 9—9 of Fig. 4.

Fig. 10 is a fragmentary front elevational view on an enlarged scale of the control means for the feed transmission.

Fig. 11 is a transverse vertical sectional view taken along line 11—11 of Fig. 9, and illustrating two clutch mechanisms forming part of the feed transmission.

Fig. 12 is a fragmentary vertical sectional view taken along line 12—12 of Fig. 10.

Fig. 13 is a fragmentary vertical sectional view taken substantially along line 13—13 of Fig. 12.

Figure 14:
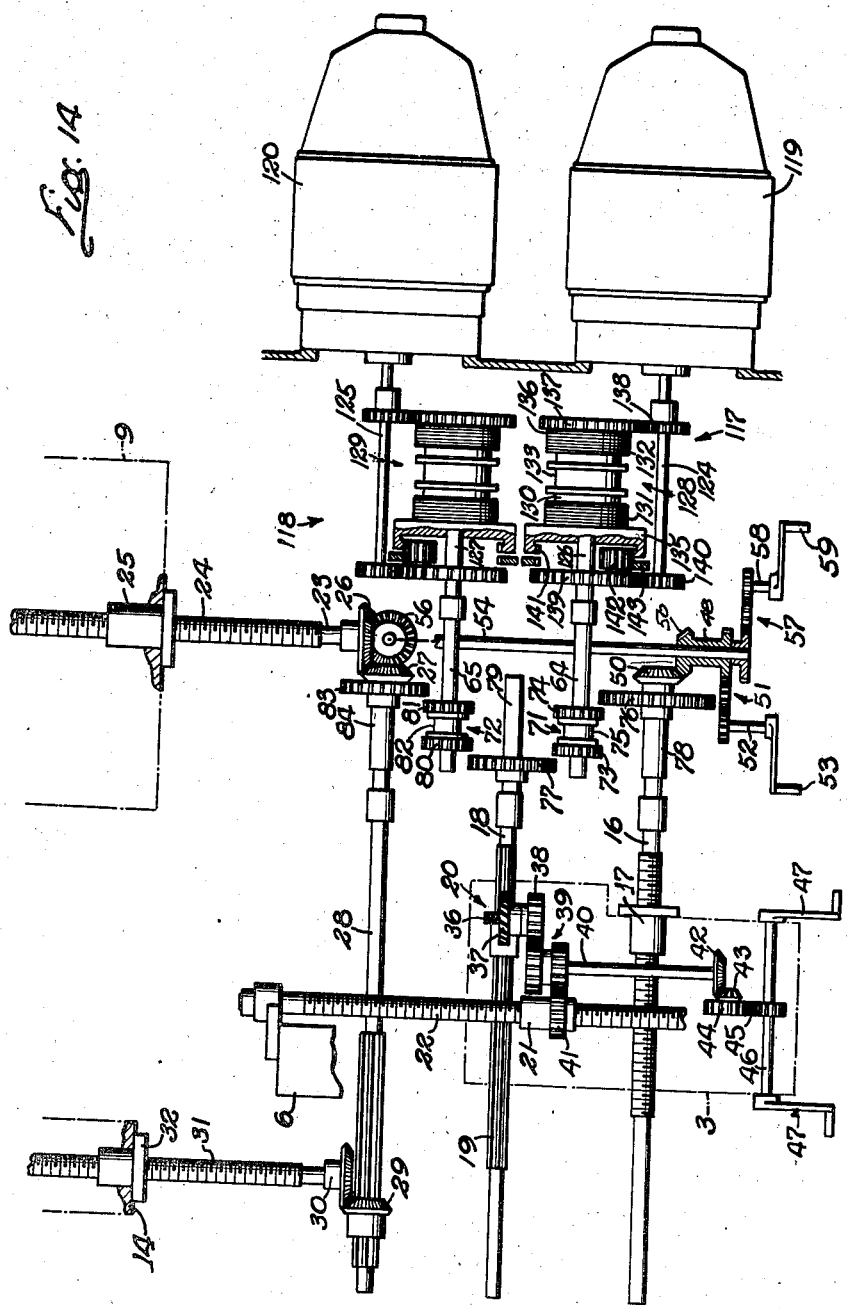

Fig. 14 is a diagrammatic representation of the feed transmission for the various machine units.

Fig. 15 is a front view, on an enlarged scale, and partially in section, of a pendant control panel for the machine.

Fig. 16 is a fragmentary sectional view taken along line 16—16 of Fig. 15.

Fig. 17 is a diagrammatic representation of a hydraulic operating system forming part of the feed transmission.

Fig. 18 is a diagrammatic representation of certain electrical control circuits for the machine.

Figure 19:
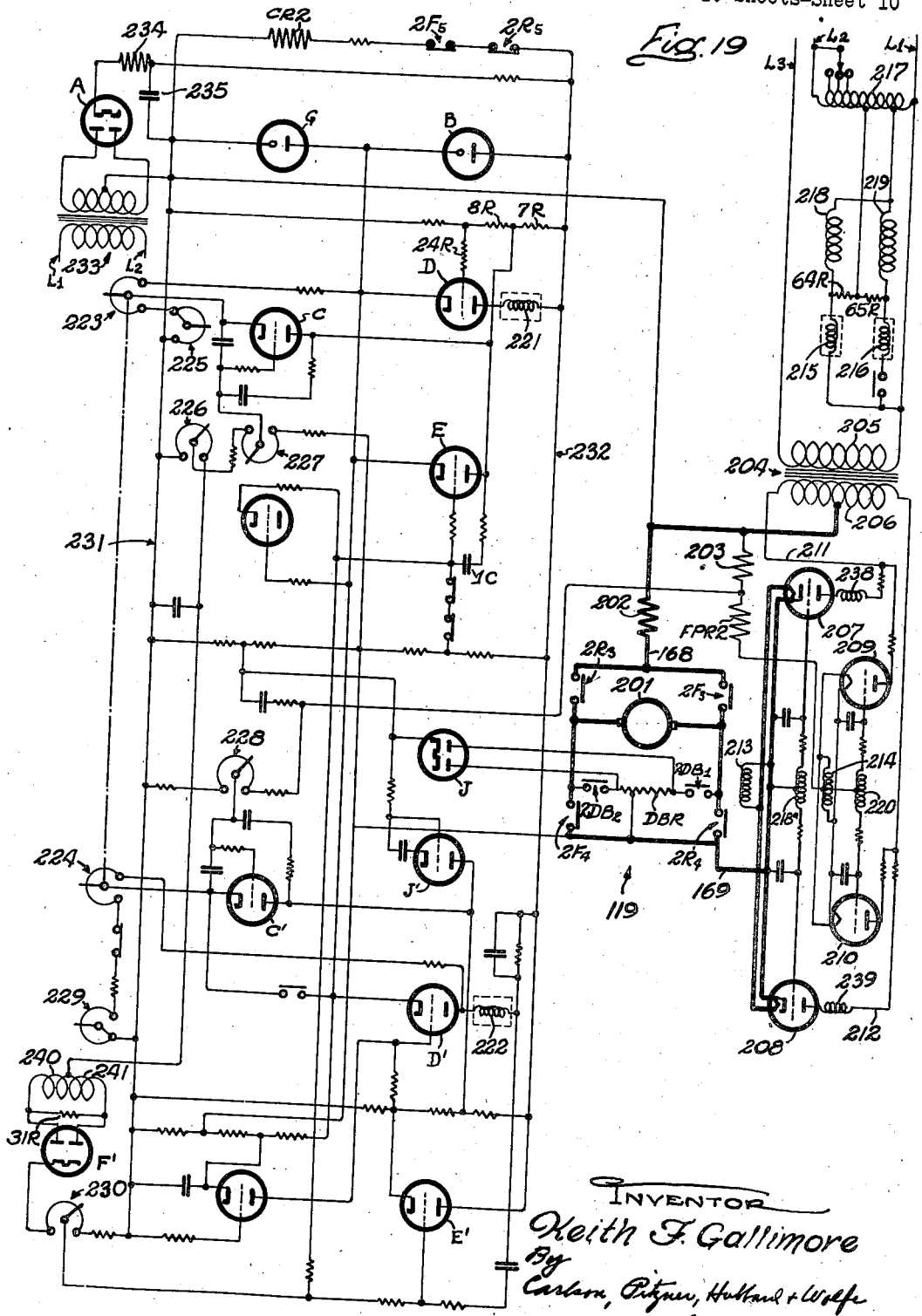

Fig. 19 is a diagrammatic representation of certain electrical control circuits for the feed drive motors.

The invention is applicable to boring machines of various types having one or more movable elements adapted to be employed in different combinations and to be translated in different selective directions as required by the machining operation to be performed. For the purposes of illustration, I have shown the invention applied to a horizontal boring, drilling and milling machine of the table type. In the particular form disclosed, the machine comprises a main bed or frame which is provided along its upper side edges with longitudinal guides or ways 2. Mounted on the ways 2 for horizontal translation longitudinally of the bed 1 is a saddle 3 which constitutes part of a work support 4, and which is provided on the top with horizontal transverse guides or ways 5. A work table 6 is supported on the ways 5 for horizontal translation transversely of the bed 1.

Rigidly mounted on one end of bed 1 is an upstanding column 7 provided with vertical guides or ways 8 on which a spindle headstock 9 is supported for vertical translation. In the present instance, the headstock 9 comprises a main horizontal spindle 10 and a parallel auxiliary spindle 11, both spindles projecting from the side adjacent the work support 4 for attachment of tools (not shown) adapted to operate on work mounted on the table 6.

Removably and adjustably mounted on the ways 2 at the other end of the bed 1 is an upstanding column or support 12 provided with guides or ways 13 on which an end block or tailstock 14 is adapted to travel synchronously with the headstock 9. The tailstock 14 carries a suitable support 15 adapted to be positioned in axial alinement with the main spindle 10, and to coact therewith in supporting a suitable tool bar or arbor (not shown).

The details of the main operating units of the machine, i. e., the saddle 3, the table 6, the headstock 9, and the tailstock 15, per se form no part of the present invention, and in the present instance are substantially the same as the corresponding parts disclosed in my prior Patent No. 1,858,491, issued May 17, 1932.

The present invention relates primarily to a new and improved power feed drive and transmission which is available to translate any one or more of the various main units 3, 6 and 9 independently of each other at varying rates of feed and each in either direction so as to increase the flexibility and range of usefulness of the machine. In general, the power transmission comprises a plurality of terminal drive shafts suitably connected to the various units, and adapted to be selectively connected through high and low speed mechanisms to a plurality of reversible and variable-speed electric drive motors. By selectively adjusting the speed-change mechanisms and the speeds of the motors, a wide range of feed rates is available. By connecting the speed mechanisms selectively to the drive shafts, various combinations of the units may be operated for different machining requirements. By selectively controlling the direction of rotation of each of the electric motors, the direction of translation of each unit may be independently determined.

*Shaft connections to units*

The terminal drive shafts (see Fig. 14) include a shaft 16 having a lead screw in threaded engagement with a non-rotatable nut 17 anchored in the saddle 3 for translating the latter along the ways 2, a second shaft 18 having longitudinal splines 19 in slidable engagement with a gear transmission 20 for driving a rotary nut 21 anchored in the saddle 3 and in threaded engagement with a non-rotatable lead screw 22 carried by the table 6 to translate the latter along the ways 5, and a shaft 23 rotatably anchored on column 7 and having a lead screw 24 in threaded engagement with a nut 25 fixed in the headstock 9 to translate the latter vertically along the ways 8. The shaft 23 is connected through bevel gears 26 and 27 to a spline shaft 28 rotatably anchored in and extending longitudinally through the bed 1. A bevel gear 29 is slidably splined on the shaft 28 and meshes with a gear 30 on a lead screw 31 rotatably anchored in the column 12. The screw 31 is in threaded engagement with a nut 32 fixed in the tailstock 14. Consequently, the lead screws 24 and 31 are driven simultaneously to translate the headstock 9 and the tailstock 14 in exact synchronism.

A vertical spline shaft 33, rotatably anchored on the column 7, is connected to a suitable source of power, such as an electric motor 34, and extends slidably through the headstock 9 and is therein adapted to be connected through a suitable variable-speed transmission (not shown) to the spindles 10 and 11 selectively to rotate and axially translate the latter.

The gear transmission 20 for the table 6 consists of a unitary structure having an enclosing housing 35 removably mounted in the saddle 3. The spline shaft 18 extends slidably through a spiral gear 36 journaled in the lower portion of the housing 35, and the nut 21 is suitably journaled in the upper portion of the housing. Meshing with the spiral gear 36 is a spiral gear 37. A gear 38, rotatable with the gear 37, is connected through a cluster gear 39 on a shaft 40 to a gear 41 rotatable with the nut 21.

The various units 3, 6 and 9 may be translated manually. In the case of the table 6, the shaft 40 extends to the front of the work support 4 and is connected through a train of gears 42 to 45 to a transverse shaft 46 journaled in and extending through the saddle 3. Suitable operating handles 47 are secured to opposite ends of the shaft 46.

The means for manually translating the saddle 3 comprises a tubular shaft 48 journaled in a bearing bracket 49 on the front of the bed 1 adjacent the right end. One end of the shaft 48 is connected through bevel gears 50 to the shaft 16, and the other end is connected through a train of gears 51 to a stub shaft 52 journaled in and extending to the front of the bracket 49 for engagement by a hand lever 53.

The manual actuating means for the headstock comprises a shaft 54 supported in a gear housing 55 within the bed 1 and extending axially through the shaft 48. A bevel gear 56 on the rear end of the shaft 54 meshes with the gear 26 to establish the connection with the screw shaft 23. At the forward end, the shaft 54 is connected through a train of gears 57 to a stub shaft 58 journaled in and extending to the front of the bracket 49 for engagement by a hand lever 59.

The gearing arrangement of the hand feed for each unit is such that directional or natural control is obtained. Thus, clockwise rotation of the right-hand lever 47 will translate the table 6 rearwardly, of the lever 53 will translate the saddle 3 to the right, and of the lever 59 will elevate the headstock 9. Counterclockwise rotation of these levers will effect translations of the respective units in the reverse directions.

Each of the units 3, 6 and 9 may be clamped in position of adjustment when not being translated. Thus, clamps 60 and 61 are provided respectively for the saddle 3 and table 6, and are operable by hand levers 62 and 63 (see Figs. 5 to 8).

*Selective drive connections*

The feed transmission, as stated, is such that the main operating units 3, 6 and 9 of the machine may be connected selectively, either individually or in various combinations, for power translation. More particularly, the terminal drive shafts 16, 18 and 23 are adapted to be connected selectively to a suitable source of power. Within the broad concept of the invention, the shafts may be connected in any desired combination to effect simultaneous translation of any two or all of the units. However, for practically all milling and drilling operations that the machine would be called upon to perform, adequate flexibility greatly surpassing that of prior machines of the same type is obtained if any two of the terminal shafts are adapted to be connected for simultaneous operation. In the present arrangement, either of the shafts 16 or 18 is adapted to be connected selectively to a power shaft 64, and either of the shafts 18 and 23 likewise is adapted to be connected selectively to a power shaft 65. As a result, the feed drive may be utilized to translate simultaneously the saddle 3 and the headstock 9, or the table 6 and the headstock, or the saddle and the table. Also by selectively connecting only one of the terminal shafts to one of the power shafts, the associated unit can be translated singly while the other two units are stationary.

The arrangement is simple and comparatively inexpensive in that only two drive motors are required to supply the power for translating the three units singly and in selected combinations. At the same time, the direction of translation of each unit can be independently controlled. The arrangement greatly increases the usefulness of the machine. For example, translation of the headstock and the table can be utilized for profiling operations performed with face milling cutters to machine unsymmetrical surfaces. These same movements can be used for profiling operations with side milling cutters which are caused to follow scribed lines of contour by selective changes in direction and rates of feed. In general, milling operations can be performed by translating the headstock and table units, and boring operations can be performed either by feeding one of the tool spindles axially or by translating the saddle unit. In the first combination, a vertical cut is provided by the headstock feed and depth control is obtained by the saddle feed. In the second combination, the table may be translated to provide horizontal milling cuts and the saddle unit may be fed to control the depth of cut.

In the preferred form, the selective drive means is housed in the transmission case 55 which is mounted in the bed 1 by means of pads 66, and which is formed with an intermediate wall 67 defining two compartments 68 and 69. The power shafts 64 and 65 extend into the transmission case 55 in parallel relation to each other and to the shafts 16, 18 and 28 and are journaled in suitable bearings in the intermediate wall 67 and one outer side wall 70. Intermediate the walls 67 and 70, the power shafts 64 and 65 are longitudinally splined, and respectively support shiftable cluster gear members 71 and 72.

The member 71 comprises axially spaced gears 73 and 74 which are separated by an annular groove 75, and which are movable in opposite directions respectively into meshing engagement with two gears 76 and 77. These gears are fixed respectively on stub shafts 78 and 79 extending through and journaled in the side walls of the compartment 68 and coupled respectively to the adjacent alined ends of the terminal shafts 16 and 18. Similarly, the member 72 comprises axially spaced gears 80 and 81 which are separated by an annular groove 82 and which are located between and movable in opposite directions respectively into meshing engagement with the gear 77 and a gear 83. The latter is fixed on a stub shaft 84 extending through and journaled in the walls of the compartment 68 and coupled to the shaft 28. The stub shafts 78 and 84 extend into the compartment 69 wherein they support the bevel gears 50 and 27.

It will be evident that by selective shifting of the members 71 and 72, various drive connections can be established. Thus, upon shifting only the member 71 to the right to engage gears 74 and 76, the feed transmission for the saddle 3 alone will be established; upon shifting only the member 71 to engage the gears 73 and 77, or the member 72 to engage the gears 77 and 80, the feed transmission for the table 6 alone will be established; upon shifting only the member 72 to the right to engage the gears 81 and 83, the feed transmission for the headstock 9 only will be established; upon shifting both members 71 and 72 to the right, the saddle and headstock will be connected to the shafts 64 and 65 for simultaneous operation; upon shifting the member 71 to the left and the member 72 to the right, the table and the headstock will be operated simultaneously, and upon shifting the member 71 to the right and the member 72 to the left, the saddle and the table will be operated simultaneously. Thus, the power shaft 64 is available to drive either the saddle 3 or the table 6 singly, and the power shaft 65 is available to drive either the table or the headstock 9 singly, the table being adapted to be driven from either of the power shafts.

Any suitable means may be provided for shifting the members 71 and 72 to obtain the desired machine operation. In the present instance, this means is shown as comprising two shifter shoes 85 and 86 respectively engaging in the grooves 75 and 82, and fixed on two shifter rods 87 and 88 slidably supported in parallel relation in the transmission case 55. The rod 87 (see Figs. 9, 10 and 12) is formed with a transverse notch 89 engaged by a lever 90 pinned on the rear end of a transverse shaft 91. The shaft 91 is suitably supported at opposite ends in the transmission case 55, and pinned to the forward end is an upwardly standing lever 92 formed with a longitudinal slot 93. A stub shaft 94 is journaled in and extends through the control housing 49, and is provided at the forward end with an operating handle or lever 95. The rear or inner end of the shaft 94 is provided with a crank disk 96 having an eccentric pin 97 extending into the slot 93. The hand lever 95 has three positions of adjustment, and is adapted to be yieldably secured in any one of these positions by means of a spring detent (not shown). Movement of the lever 95 into the left-hand position will shift the member 71 to the right to engage the feed drive to the saddle 3. Movement of the lever 95 into the right-hand position will shift the member 71 to the left to engage the feed drive to the table 6. When the lever 95 is in the central or neutral position, all drives from the power shaft 64 are disconnected.

The rod 88 is formed with a transverse notch 98 engaged by the lever 99 pinned on the rear end of a transverse shaft 100. The shaft 100 is suitably supported at opposite ends in the transmission case 55, and pinned to the forward end is an upwardly standing lever 101 formed with a longitudinal slot 102. A stub shaft 103 is journaled in and extends through the control housing 49, and is provided at the forward end with an operating handle or lever 104. The rear or inner end of the shaft 103 is provided with a crank disk 105 having an eccentric pin 106 extending into the slot 102. The hand lever 104 has three positions of adjustment and is adapted to be yieldably secured in any one of these positions by means of a spring detent (not shown). Movement of the lever 104 into the left-hand position will shift the member 72 to the left to engage the feed drive to the table 6. Movement of the lever 104 into the right-hand position will shift the member 72 to the right to engage the feed drive to the headstock 9. When the lever 104 is in the central or neutral position, all drives from the power shaft 65 are disconnected.

Interlock means is provided for preventing simultaneous connection of the terminal shaft 18 for the table 6 to both power shafts 64 and 65. In the present instance, this means comprises two axially alined rods 107 and 108 slidably supported at their opposite ends in the control housing 49. The adjacent ends of the shafts 107 and 108 are independently slidable and disposed for end abutting engagement in a bore 109 formed in a lug 110 depending into a longitudinal channel 111 in the underside of the housing 49. Two dogs 112 and 113 are pinned respectively to the rods 107 and 108 for slidable movement therewith, and depend downwardly for engagement by cams 114 and 115 fixed on the shafts 94 and 103. The cams 114 and 115 are similarly shaped but oppositely disposed, and each has a rise formed with a flat abutment surface 116. It will be noted that the shaft 94 may be rotated counterclockwise and the shaft 103 may be rotated clockwise at any time to connect the saddle 3 and the headstock 9 respectively for translation without interference by the dogs 112 and 113. However, if the shaft 94 is rotated clockwise to connect the terminal shaft 18 for the table 6 to the power shaft 64, the cam 114 will engage the dog 112 to shift the rod 107 to the right into substantially abutting engagement with the rod 108, and the abutment face 116 on the cam will lock the rod 107 in this position. As a result, the other rod 108 is constrained against leftward movement, and through the dog 113 and cam 115 will prevent rotation of the shaft 103 in a counterclockwise direction to connect the shaft 18 with the power shaft 65. Likewise, assuming that the member 71 is not in the left-hand position, upon rotation of the shaft 103 in a counterclockwise direction, the cam 115 will engage the dog 113 to shift the rod 108 to the left into position to prevent clockwise rotation of the shaft 94. In either case, if one of the members 71 and 72 is shifted to the left, the other member cannot be shifted to the left to connect the feed drive for the table 6, but can occupy only the neutral position or be shifted to the right.

*Feed range adjustment*

The power shafts 64 and 65 are arranged for connection respectively through adjustable two-speed mechanisms 117 and 118 to two electric reversible variable-speed motors 119 and 120. To obtain a greatly increased range of feeds, each of the mechanisms 117 and 118 constitutes a transmission providing high and low superimposed speed ranges. The speed ratio of the transmissions is such that in changing from one speed range to the other there is continuity in the progressive sequence of feed rate, with adequate torque at the lowest motor speed utilized. Thus, different ratios may be provided depending on the requirements. In some instances, the ratio may advantageously be approximately equal to the speed range of the feed motors 119 and 120. For example, if the motor speed range were 20:1, and the transmission speed ratio also were 20:1, the power shafts would be operable at speeds from 1 to 20 R. P. M. when the low speed connection is established and at speeds from 20 to 400 R. P. M. when the high speed connection is established, merely by varying the speeds of their drive motors. In other instances, it may be desirable to provide a speed ratio less than that of the feed motors, such for example as 12:1 for a maximum motor speed range of 20:1. In this case, the full speed range of each feed motor might be employed for the low speed range setting of the transmission, and only the upper 60 percent of the motor speed range would be employed for the high speed range setting.

The two-speed mechanisms or transmissions 117 and 118 are housed in the bed 1 adjacent the right end, and comprise two spaced bearing plates 121 and 122 constituting opposite end sections. These plates are rigidly supported in position by a plurality of pads 123 secured to the internal structure of the bed 1. Journaled in and extending between the plates 121 and 122, in parallel relation to each other and to the power shafts 64 and 65, are two shafts 124 and 125 alined with and coupled respectively to the motors 119 and 120; and two shafts 126 and 127 alined with and coupled to the power shafts. Two multiple clutches 128 and 129 are provided for connecting the outlet shafts 126 and 127, each selectively through high and low speed gear transmissions, respectively, to the associated inlet shafts 124 and 125.

The speed transmissions 117 and 118 preferably are alike in construction. Considering first the drive for the shaft 64, the clutch 128 comprises a sleeve 130 slidably splined on the shaft 126 for rotation therewith, and having opposite end clutch elements 131 and 132, and an intermediate annular groove 133 engageable by a shifter shoe 134. Freely rotatable on the shaft 126 in position for engagement respectively by the elements 131 and 132 upon movement of the sleeve 130 respectively in opposite directions are two driving clutch elements 135 and 136. The element 136 is rigid with a coaxial gear 137 meshing with a gear 138 on the shaft 124 to constitute the high speed gear drive. Rotatable on the opposite end of the shaft 126 is a gear 139 meshing with another gear 140 on the shaft 124, the speed ratio of these gears being the same as that of the gears 137 and 138. The clutch element 135 is rigid with a coaxial internal gear 141 which meshes with a pinion 142 carried eccentrically by the gear 139 and meshing with a stationary internal ring gear 143. The gear 141 has a slightly greater number of teeth than the gear 143 so that the arrangement has a differential action by reason of which the gear 141 is rotated at a much slower speed than the gear 139. For example, if the gear 143 has fifty-seven teeth and the gear 141 has sixty teeth, the speed ratio of the high speed drive to the low speed drive will be 20:1. Since the other transmission 118 is the same in construction, it will not be described in detail, except to state that the clutch sleeve in this instance is engaged by a shifter shoe 144.

The clutches 128 and 129 are selectively adjustable under remote control, and preferably from a centralized control station, such as a pendant 145 movably suspended from the column 7 at the front of the machine. The clutch adjusting means may be hydraulic, and the control therefor may be electric. In the present instance, two reversible hydraulic actuators 146 and 147 are mounted on the end plate 121, and have piston rods 148 and 149 slidable in the plates 121 and 122 and connected respectively to the shifter shoes 134 and 144.

Hydraulic fluid under pressure may be supplied to the actuators 146 and 147 from any suitable source (see Fig. 17), such as a pump 150 having an intake line 151 taking fluid from a reservoir 152, and an outlet line 153 including a working pressure relief valve 154 for maintaining a constant predetermined pressure therein. The pump 150 is driven by an electric motor 155 mounted on the right end of the bed 1.

The pressure line 153 is adapted to be connected in parallel respectively by two reversing valves 156 and 157 to the actuators 146 and 147. The valve 156 comprises a plunger 158 normally biased into one end position by a compression spring 159 to connect the pressure line 153 to a supply line 160 leading to one end of the actuator 146, and to connect a line 161 from the other end of the actuator to a drain line 162 discharging to the reservoir 152. The other valve 157 is of the same construction, and hence is not described in detail, it sufficing to say that it normally connects the pressure line 153 to a line 163 leading to one end of the actuator 147, and a line 164 from the other end of the actuator to a drain line 165. Both valves 156 and 157 are normally biased to effect movement of the actuators 146 and 147 to the right, and hence to actuate the clutches 128 and 129 in a direction to establish the high-speed drive range.

The valves 156 and 157 are shiftable selectively into reverse position upon energization of two solenoids 166 and 167 operatively associated with the respective valve plungers. Thus, upon energization of the solenoid 166, the low speed drive range for the saddle 3 or table 6 will be established, and upon energization of the solenoid 167 the same range for the table or the headstock 9 and tailstock 14 will be established.

Electrical control circuits and operation

Electric power is adapted to be supplied from three supply mains or lines $L_1$, $L_2$ and $L_3$ normally connected to a suitable source of three-phase alternating current, and directly serving the spindle and oil pump motors 34 and 155. Direct current is adapted to be supplied to each of the feed motors 119 and 120 from the mains $L_1$, $L_2$ and $L_3$ through a power circuit in which the alternating current is rectified electronically. Each of the feed motors 119 and 120 is equipped with means for effecting a finely graduated speed variation. Electronic circuits suitable for such speed control are available in more or less standard form, a suitable example of which is shown in Fig. 19 and hereinafter outlined. The particular electronic circuit illustrated is designed not only for speed control, but also for affording limited torque at starting, current limit and IR drop compensation. For the moment suffice it to say that current, suitably controlled by the electronic means hereinafter described, is supplied to the feed motors 119 and 120 through the respective pairs of leads 168, 169 and 170, 171 appearing in Fig. 18.

To condition the machine for operation, it is necessary first to start the oil pump motor 155 so as to build up pressure in the hydraulic system. The motor 155 is started by momentarily closing a push button run switch 172 to complete a circuit across the lines $L_1$ and $L_2$ through a relay coil OP. Upon becoming energized, the relay coil OP closes sealing contacts OP₁ to establish a holding circuit across the switch 172, and closes contacts OP₂ to connect the oil pump motor 155 to the lines $L_1$, $L_2$ and $L_3$. Interposed in the circuit in series with the sealing contacts OP₁ are a push button stop switch 173 and a master stop switch 174. Opening of either of these switches will stop the entire machine operation. The relay coil OP serves also to connect the line $L_1$ through the sealing contacts OP₁ to a secondary main or line $L_4$, thereby conditioning the circuits for the driving motors 34, 119 and 120. However, before the spindle motor 34 can be operated, the working pressure in the hydraulic system must be established, as it normally will be upon operation of the oil pump motor 155, to close a pressure switch 175.

The spindle motor 34 is adapted to be started by momentarily closing a push button run switch 176 to complete a circuit across the lines $L_4$ and $L_2$ selectively through one or the other of forward and reverse relay coils 1F and 1R as determined by the setting of a selector switch 177. For forward operation, the circuit is completed from the line $L_4$, through the pressure switch 175, normally closed contacts 178 of a push button stop switch 179, the run switch 176, the selector switch 177, and the relay coil 1F to the line $L_2$. For reverse operation, the circuit is the same except that it is completed from the selector switch 177 through the relay coil 1R.

Upon becoming energized, the relay coil 1F closes sealing contacts 1F₁ to establish a holding circuit, opens interlock contacts 1F₂ in the circuit for the relay coil 1R, closes contacts 1F₃ to connect the spindle motor 34 to the lines $L_1$, $L_2$ and $L_3$ for forward operation, and closes contacts 1F₄ to connect the line $L_4$ to a secondary line $L_5$ for supplying current to the starting control circuits for the feed motors 119 and 120.

Likewise, upon becoming energized, the relay coil 1R closes sealing contacts 1R₁, opens interlock contacts 1R₂, closes motor contacts 1R₃ to institute reverse operation of the motor 34, and closes contacts 1R₄ to condition the feed motor circuits. It will thus be evident that the feed motors 119 and 120 cannot be operated unless the spindle motor 34 is in operation, and that the latter cannot be operated unless the oil pump motor 155 is in operation.

The circuit for the spindle motor 34 may be conditioned for continuous operation as just described, or for intermittent or "inching" operation under the control of the run switch 176. To this end, the push button stop switch 179 has a second set of contacts 180 in the shunt circuit across the run switch 176 and alternate contacts 181 paralleling the contacts 178. For continuous operation, the stop switch 179 is adjusted to close the contacts 178 and 180, thereby enabling completion of the holding circuit by either of the contacts 1F₁ or 1R₁. For intermittent operation, the stop switch 179 is adjusted to open the contacts 178 and 180 and close the alternate contacts 181, thereby permitting completion of the energizing circuit only through the run switch 176. Consequently, the spindle motor 34 will operate only when the run switch 176 is closed, and will stop when the switch is released.

Assuming that the electronic power and control circuits for the feed motors 119 and 120 are operative, relay coils CR2 and FPR2 will be energized respectively to close contacts $CR2_1$ and $FPR2_1$, thereby conditioning the starting control circuit for the motor 119. Similar relay coils in duplicate power and control circuits (not shown) are operable to close corresponding contacts $CR3_1$ and $FPR3_1$ in the starting control circuit for the other feed motor 120.

As in the case of the spindle motor 34, each of the feed motors 119 and 120 is adapted to be conditioned selectively for operation either continuously or intermittently and in either direction. More specifically, the direction of operation of the motors 119 and 120 is controlled respectively by selector switches 182 and 183. In one position of the selector switch 182, the feed motor 119 will be operated to translate the saddle 3 to the left or the table 6 forwardly. In the other position of the switch 182, the movements of the saddle and table will be reversed. Likewise, when the switch 183 is in one position, the motor 120 will operate to elevate the headstock 9 or translate the table 6 forwardly. When the switch 183 is in the opposite position, the motor 120 will lower the headstock or translate the table rearwardly.

The feed motor 119 is adapted to be started by closing a push button run switch 184 to complete a circuit across the lines $L_5$ and $L_2$ through a stop switch 185, the selector switch 182, and one or the other of forward and reverse relay coils 2F and 2R. If the relay coil 2F is energized, it will close sealing contacts $2F_1$, open interlock contacts $2F_2$ in the circuit for the coil 2R, and close starting contacts $2F_3$ and $2F_4$ in the electronic power circuit for the feed motor 119. Likewise, if the relay 2R is energized, it will close sealing contacts $2R_1$, open interlock contacts $2R_2$ and close starting contacts $2R_3$ and $2R_4$ in the electronic power circuit for the feed motor 119.

The stop switch 185 is similar to the switch 179 for the spindle motor 34, and comprises two sets of contacts 186 and 187 adapted to be closed so as to enable the establishment of a holding circuit, or alternate contacts 188 adapted to be closed to permit establishment of the energizing circuit only through the run switch 184.

The starting circuit for the second feed motor 120 is similar to that for the feed motor 119. To start the second feed motor, a push button run switch 189 is depressed momentarily to complete a circuit across the lines $L_5$ and $L_2$, through a stop switch 190, the selector switch 183, and one or the other of forward and reverse relay coils 3F and 3R. If the relay 3F is energized, it will close sealing contacts $3F_1$, open interlock contacts $3F_2$, and close motor starting contacts $3F_3$ and $3F_4$. If the relay 3R is energized, it will close sealing contacts $3R_1$, open interlock contacts $3R_2$ and close motor starting contacts $3R_3$ and $3R_4$. The stop switch 190 has contacts 191 and 192 adapted to be closed for continuous operation, and alternate contacts 193 adapted to be closed for intermittent operation.

Figure 1:
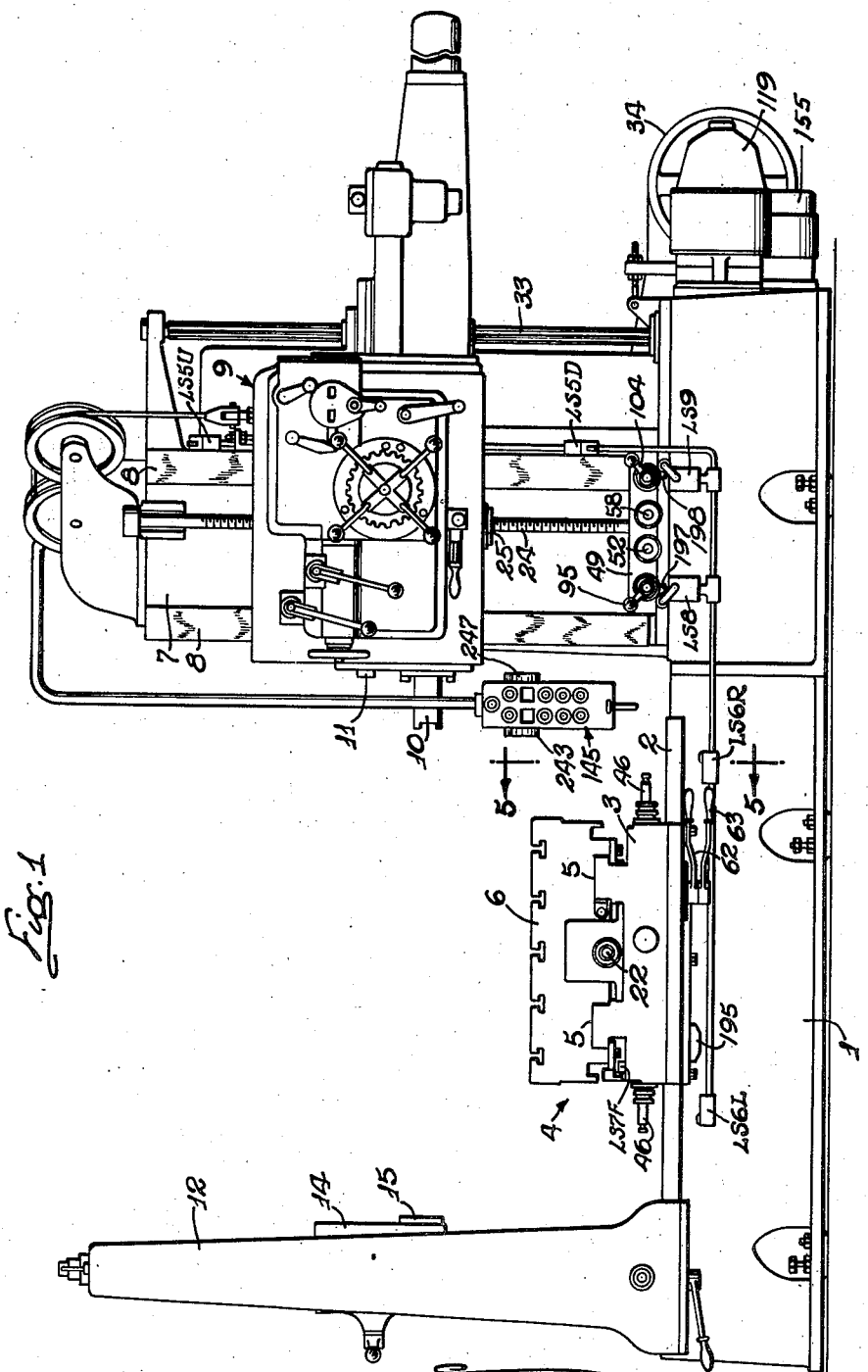
Figure 1 is a front elevational view of a machine embodying the features of my invention.
Figure 2:
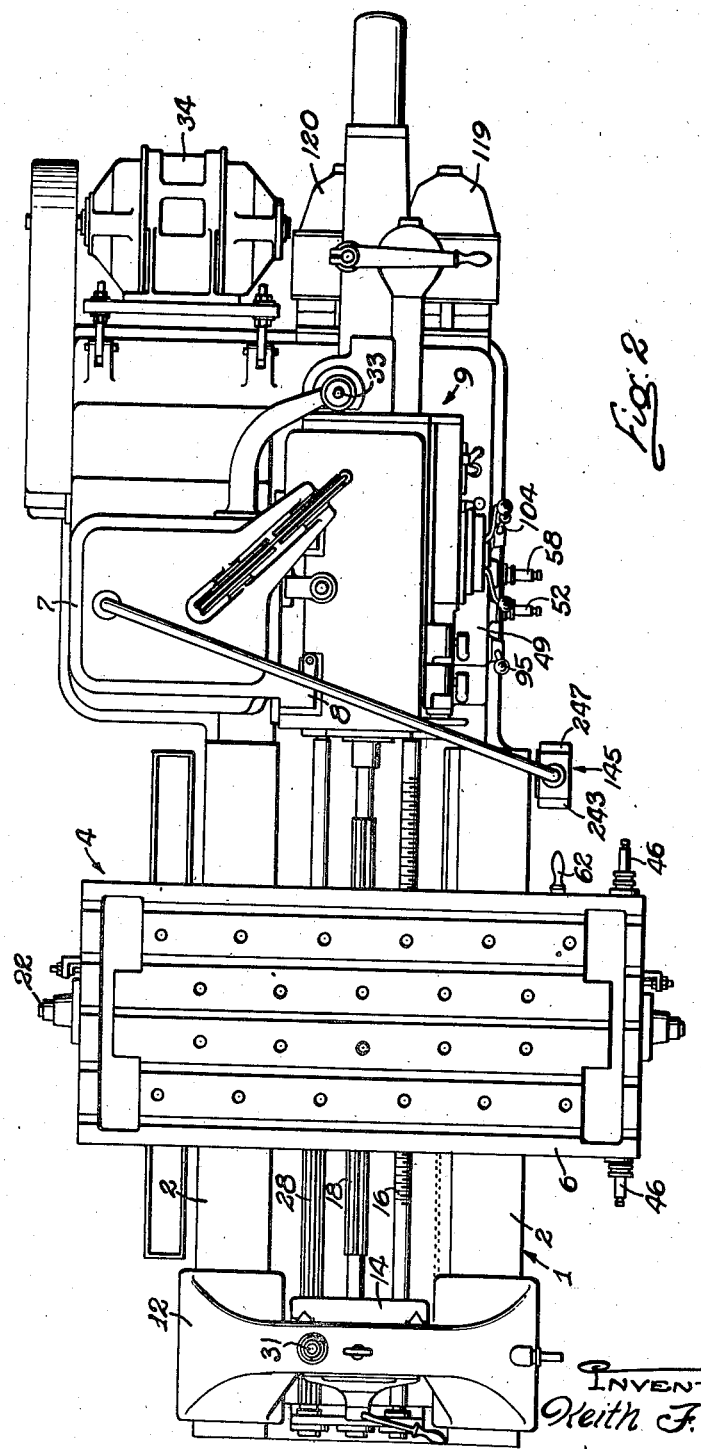
Fig. 2 is a plan view.

Suitable limit switches are actuatable by the saddle, table and headstock units 3, 6 and 7 at the ends of their respective movements to stop the feed motors 119 and 120. These comprise limit switches LS5U and LS5D (see Fig. 4) mounted on the column 7 for engagement by spaced cams 194 on the headstock 9; limit switches LS6L and LS6R (see Fig. 1) mounted on the front of the bed 1 for engagement by spaced cams 195 on the underside of the saddle 3; and limit switches LS7F and LS7R (see Fig. 6) mounted on the saddle for engagement by spaced cams 196 on one side of the table 6. The limit switches are appropriately connected in series with the motor starting relay coils, i. e., LS6L and LS7F with the coil 2F, LS6R and LS7R with the coil 2R, LS5U and LS7F with the coil 3F, and LS5D and LS7R with the coil 3R. Only one pair of limit switches is operatively connected in the circuit for each direction of motor rotation, and to this end, double acting selector limit switches LS8 and LS9 are mounted on the front of the bed 1 for engagement respectively by cams 197 and 198 on the hand levers 95 and 104. The arrangement is such that when the feed drive from the motor 119 is connected to the saddle 3, the table limit switches are bypassed, and when the drive is to the table 6, the saddle limit switches are bypassed by the switch LS8, in the circuits for the coils 2F and 2R. Similarly, the limit switch LS9 is actuated to bypass the table limit switches when the headstock 9 is operated, and to bypass the headstock limit switches when the table 6 is operated, from the motor 120. Before turning to the feed motor power and control circuits, it is to be noted that the valve operating solenoids 166 and 167 are adapted to be connected across the lines $L_1$ and $L_2$ by closing respectively switches 199 and 200.

The feed motor 119 has an armature 201, a series field 202 and a separately excited field 203. The two sets of main contacts $2F_3$, $2F_4$ and $2R_3$, $2R_4$, which are controlled by the relay coils 2F and 2R, respectively, form part of a reversing contactor adapted to connect the motor armature 201 reversibly across the lines 168 and 169.

The usual dynamic braking resistor DBR is arranged to be connected across the motor armature 201 by normally closed auxiliary contacts $2DB_1$ and $2DB_2$. These contacts are controlled by a relay coil 2DB adapted for connection across the lines $L_5$ and $L_2$ through normally closed contacts $2F_5$ and $2R_5$ controlled by the relay coils 2F and 2R. When either of the relay coils 2F or 2R is energized, the circuit through the coil 2DB is interrupted and, consequently, the contacts $2DB_1$ and $2DB_2$ are open. When both coils 2F and 2R are deenergized, the coil 2DB is energized to close the contacts $2DB_1$ and $2DB_2$ and thereby effect dynamic braking of the motor 119.

A similar dynamic brake resistor DBR (Fig. 18) is provided for the second feed motor 120, and is controlled by a relay coil 3DB adapted for connection across the lines $L_5$ and $L_2$ through normally closed contacts $3F_5$ and $3R_5$ operable by the relays 3F and 3R.

Attention may now be given to the electronic circuits (Fig. 19) employed in supplying current to the feed motors 119, 120 in a manner to accomplish adjustment of their speeds and the other control functions heretofore noted. The circuits for but one of the feed motors 119 is shown in Fig. 19, since those for the other may be a duplicate. The particular circuit shown in Fig. 19 is included as a unit under the name "Thy-Mo-Trol" and complete analysis will be found in a paper "Thyratron Motor Control" presented by Messrs. E. E. Moyer and H. L. Palmer at the June 21–25, 1943, meeting in Cleveland, Ohio, of the A. I. E. E. Accordingly, simply a more or less general outline here will suffice.

Current for the feed motor 119 (Fig. 19) is supplied from a power transformer 204 having a primary winding 205 and center tapped secondary winding 206, the current for the armature 201 being rectified by a first pair of grid controlled rectifiers or thyratrons 207, 208, and that for the motor separately excited field 203 by a second pair 209, 210. Pairs of tubes are used to afford full wave operation. The anodes of the thyratrons 207, 209 are connected to one end terminal of the transformer secondary 206 through a line 211, while the anodes of the other thyratrons 208, 210 are connected to the opposite end terminal through a conductor 212. The cathodes of the thyratrons 207, 208 are connected to the midpoint of the transformer secondary 206 through the motor armature 201, whereas the cathodes of the other pair of thyratrons 209, 210 are connected to this mid-point through the field 203. Heating current for the cathodes of the pairs of thyratrons 207, 208 and 209, 210 is supplied from respective additional windings 213, 214 of the transformer 204.

The amount of current passed by the pairs of thyratrons 207, 208 and 209, 210 is, as customary in thyratron circuits, controlled by varying the phase of their grid bias with reference to the phase of the anode or plate potentiometer. In this instance, the necessary shift of grid voltage is accomplished through the use of conventional inductance-resistance bridges in which the inductance is a variably saturable reactor. In the particular circuit shown, the bridge for the grid circuits of the armature-supply thyratrons 207, 208 includes a saturable core reactor 215, while that for the field-control thyratrons 209, 210 includes a similar saturable core reactor 216. Current is supplied to the bridges from a potentiometer 217 connected across supply lines L₁, L₂, and resistors 64R and 65R constitute the resistance legs of respective ones of the bridges. Connected across the output terminals of the bridge, including the reactor 215, is a transformer primary winding 218 inductively coupled with a center tapped secondary winding 218ᵃ connected in the grid circuits of the thyratrons 207, 208. Similarly, a transformer primary winding 219 across the output of the other bridge is inductively coupled with a center tapped secondary winding 220 and the grid circuits of the other pair of thyratrons 209, 210. The saturation of the core for the reactor 215, and hence the inductance of the latter, is controlled by variations in direct current passed through an associated saturating winding 221, and similarly the inductance of the other reactor winding 216 is controlled by the amount of direct current passed through an associated saturating winding 222.

When there is very little direct current passing through the reactor saturating winding 221, the reactance of the winding 215 is large and the alternating current voltage supplied to the transformer winding 218ᵃ is far out of phase with the alternating current voltage applied to the anodes of the thyratrons 207, 208. Therefore, the winding 218ᵃ does not fire the latter tubes until very late in their respective half cycle. The voltage supplied to the motor armature 201 is, therefore, low so that the motor turns at low speed. On the other hand, when the amount of direct current supplied to the saturating winding 221 is increased, the resultant change in reactance in the winding 215 causes the voltage across 218ᵃ to become more in phase with the anode voltage on the thyratrons 207, 208. Consequently, the winding 218ᵃ fires the tubes 207, 208 earlier in their respective half cycles increasing the motor speed. Changes in field current passed by the other pair of thyratrons 209, 210 is accomplished in substantially the same manner as will be evident from the similarity of the circuit. The adjustment of field strength is, however, used to preset different speed levels so as to expand the range of speed control, all regulation within the selected level being accomplished by armature control.

Variation of the direct currents supplied to the saturating windings 221, 222 is accomplished through the use of an electronic network (Fig. 19). In brief, the arrangement is such that motor speed is varied by manual adjustment of a pair of potentiometers 223, 224 ganged together for operation in unison. The control portion of each potentiometer is compressed into half the range of angular adjustment and the other half is a conducting segment of negligible resistance. These are so staggered that the slider of one potentiometer is on its conductor segment when the slider of the other is on its control portion, and vice versa. Since these potentiometers are small, they may be conveniently mounted at some point on the machine more or less remote from the feed motor, as for example in the control pendant 145 as shown in Fig. 15.

Other manually operable adjusting or control devices comprised in the network of Fig. 19 include potentiometer 225 for adjusting the minimum value of the speed range for the motor, potentiometers 226 and 227 for respectively adjusting the amount of IR drop compensation and the armature voltage, a potentiometer 228 for adjusting the field voltage, a potentiometer 229 for adjusting the maximum value of the motor speed range, and a potentiometer 230 for adjusting the current limiting action of the controls.

Direct current potential for the electronic network of Fig. 19 is applied from a pair of conductors 231, 232 which are supplied from a full wave rectifier comprising a twin diode A. The latter is supplied by a transformer 233 connected across supply lines L₁, L₂ and feeding current to the lines 231, 232 through a filter comprising a choke 234 for condenser 235. A voltage divider comprising series connected resistors 7R, 8R and 24R is connected across the lines 231, 232. The voltages are regulated by tubes B, G which operate on the current arc-drop principle, thus eliminating the effects of line voltage variation.

Current is supplied to the saturating winding 221 of the armature circuit control reactor 215 by the output of a triode D. The potential of the control grid of this tube, and hence the amount of direct current passed through the winding 221, depends upon the voltage drop across the resistor 7R to which such grid is connected through resistors 24R and 8R. The amount of voltage drop across the resistor 7R depends, in turn, upon how much current is passing through triode tubes C and E. The tube C is employed for varying the drop across the resistor 7R in accordance with the setting of the speed control potentiometer 223, whereas the tube E is employed as part of an arrangement for safely limiting the current supplied to the motor armature, particularly during starting.

Speed adjustment may be effected throughout an extremely wide range by simply turning the ganged potentiometers 223, 224. During the portion of the range of adjustment of these potentiometers, in which the potentiometer 223 is active, changes in its adjustment vary the current passed by the thyratrons 207, 208 to the motor armature, while during the range of adjustment in which the potentiometer 224 is active, it varies the current passed by the thyratrons 209, 210 to the motor field 203.

Automatic speed regulation is accomplished by comparing the armature voltage to a standard voltage, the latter being derived from the regulated supply afforded by the tubes B, G. The difference between these two voltages is amplified and applied to the grid of the triode D which saturates the reactor 215. The triode C is utilized for that purpose. The armature voltage is applied to the grid of the tube C and as it tends to increase, the grid of the tube becomes less negative thereby turning off the tube C so that the latter tends to turn the tube D off, reducing the current through the saturating winding 221 and diminishing the output of the thyratrons 207, 208. Tendency of the armature voltage to decrease results in an opposite action.

Compensation for changes in IR drop in the armature is desirable since armature speed is proportional to armature terminal voltage only when the armature is drawing no current. Where, as here, armature is used in effecting speed regulation, compensation should, therefore, be made for changes in IR drop to effect accurate regulation. For this purpose, it is necessary to introduce in the armature control circuit a voltage proportional to the armature current and in such a direction as to hold a higher armature voltage as the load on the motor increases. To that end, a pair of coupling transformers having primary windings 238, 239 in the anode circuits of the thyratrons 207, 208 are utilized for deriving a current proportional to motor armature current. These primary windings are inductively coupled with secondary windings 240, 241. The pulses of current through the latter are rectified by full wave rectifier shown as the duplex rectifier F', a resistor 31R serving to load the secondaries 240, 241. The direct current voltage output of F' is proportional to motor armature current and is applied to the network to subtract from that part of the armature voltage that is used as a feed back, and thus causes a higher voltage to be maintained by the regulating action of the system. Adjustment of potentiometer 226 may be utilized to effect either over or under compounding.

In order to prevent excessive currents being drawn during starting, other acceleration conditions, or sudden application of load, an automatic current limiting control is incorporated. The same direct current potentiometer derived from the rectifier F' in proportion to armature current for purposes of IR drop compensation, as noted above, is utilized to afford a current-limit signal. For that purpose this signal is compared to a known voltage standard and the difference amplified by the triode E. The point at which the current limit control takes over is adjustable by means of the potentiometer 230. As long as the voltage on the slider of this potentiometer is less than a predetermined value, the triode E is inoperative and the triode C will have complete control. If higher armature current causes the voltage on the potentiometer slider 230 to reach such predetermined value, the triode E will pass full plate current, thus retarding the phase of the grid voltage on the thyratrons 207, 208. The armature current is thus reduced until a point of balance is reached. With this control, it is possible to accelerate from zero to full speed without drawing more than the preset value of armature current. Normally closed interlock contacts 2F₅, 2R₅ on the main reversing contactors 2R, 2F for the feed motor 119 are used to give a false signal in a current limit circuit at starting. When these contacts are both closed, the condenser IC is charged so that during the first phase cycles after one or the other of the contacts 2F₅ or 2R₅ opens at starting, potentiometer will be applied to the triode E from the condenser, rendering the triode operative even during the initial period when no armature current signal is available. After the first few cycles, this signal becomes available and operation continues as previously described.

As heretofore noted, the range of speed adjustment is enlarged by making possible control of both the armature and field currents for the feed motor 119. With the potentiometers 223, 224 arranged as heretofore described, the field excitation remains at rated value while the motor speed is being controlled by varying the armature voltage while conversely the armature voltage remains at rated value when operating the motor in the weak field range. In the weak field range, the speed is preset by adjusting the field current, but the regulation is still accomplished through automatic regulation of the armature voltage as heretofore described. The circuit employed for the field control is similar to that for the armature including a triode D' which feeds current to the saturating winding 222 and triodes C' and E' which, in turn, control the triode D', the same being related in a manner to the triodes C, D and E heretofore noted. Provision is also made for voltage snubbing and preconditioning through use of a triode J' and duplex diode rectifier J. They act to retard the application of field when the armature voltage exceeds a preset amount as, for example, when the speed control potentiometers 223, 224 are suddenly turned from the weak field condition to a speed calling for full field.

*The control pendant*

Operational control is incorporated in one centralized control panel which in the present instance comprises the pendant 145 conveniently suspended at the operator's station. Thus, the pendant 145 houses the run switch 176 and the stop switch 179 adjustable either for continuous run or for inching, and the direction control switch 177 for the spindle motor 34. Also mounted on the pendant 145 are the run switch 184, the latch-type stop switch 185, and the saddle or table selector switch 182 for controlling the drive from the motor 119, and the run switch 189, the stop switch 190 and the selector switch 183 for the headstock and table. The master stop switch 174 is located in the pendant 145 adjacent the lower end.

Mounted within the pendant 145 at one side are the potentiometers 223 and 224 having an adjusting shaft 242 extending through the left side wall and operable by a hand wheel 243 journaled on the outside of said wall. The shaft 242 has a pinion 242ᵃ thereon meshing with an internal gear 243ᵃ rigid with the wheel 243. A stop 243ᵇ serves to limit rotation of the wheel 243 to one revolution or slightly less. A similar set of speed-control potentiometers 244, 245 for the motor 120 is mounted in the pendant 145, and has an adjusting shaft 246 extending through the side wall and provided with an operating hand wheel 247. Cams 248 and 249, fixed on the adjacent ends of the potentiometer shafts 242 and 246, are operable respectively to actuate the toggle switches 199 and 200 controlling the valve solenoids 166 and 167. In the present instance, the gear ratio is such that for slightly less than one revolution of each hand wheel 243, the associated potentiometer shaft 242 will make approximately two revolutions for the complete feed range, i. e., one revolution for the slow-speed range at the end of which on the ascending scale it is operable to open the associated toggle switch, and one revolution for the high-speed range at the end of which on the descending scale it is operable to close the toggle switch.

Mounting of the two sets of potentiometers 223, 224 and 244, 245 in the pendant 145, with their adjusting elements 243 and 247 at opposite sides, is particularly advantageous since it permits the operator, in contouring operations, to grasp and adjust both potentiometer controls simultaneously while holding the pendant 145 in his two hands.

I claim as my invention:

1. A machine comprising, in combination, a support, three machine units slidable on said support, three drive transmissions operatively connected respectively to said units and each having a terminal power inlet shaft, two reversible electric drive motors mounted on said bed and being selectively adjustable in speed over a predetermined range, two adjustable high and low speed mechanisms connected respectively to said motors and having outlet power shafts, each speed mechanism being adjustable to provide a total speed range which is larger than the motor speed range, and means for connecting one of said power shafts selectively to a first or second of said terminal shafts and the other of said power shafts selectively to said second or a third of said terminal shafts, whereby said units may be translated independently in direction and speed and either individually or in any combination of two.

2. A machine comprising, in combination, a support, three machine units slidable on said support, three drive transmissions operatively connected respectively to said units and each having a terminal power inlet shaft, two reversible drive motors mounted on said bed and being selectively adjustable in speed over a predetermined range, two adjustable speed mechanisms connected respectively to said motors and having outlet power shafts, each speed mechanism being adjustable to provide a total speed range which is a multiple of the motor speed range, and means for connecting one of said power shafts selectively to a first or a second of said terminal shafts and the other of said power shafts selectively to said second or a third of said terminal shafts, whereby said units may be translated independently in direction and speed and either individually or in any combination of two.

3. A machine comprising, in combination, a support, three machine units slidable on said support, three drive transmissions operatively connected respectively to said units and each having a terminal power inlet shaft, two reversible drive motors mounted on said bed and being selectively adjustable in speed over a predetermined range, two adjustable speed mechanisms connected respectively to said motors and having outlet power shafts, each speed mechanism providing two speeds of a ratio corresponding substantially to the speed range of the associated motor, means for connecting one of said power shafts selectively to a first or second of said terminal shafts and the other of said power shafts selectively to said second or a third of said terminal shafts, and interlock means for preventing connection of both mechanisms simultaneously to said second terminal shaft, whereby said units may be translated independently in direction and speed and either individually or in any combination of two.

4. A horizontal boring, milling and drilling machine comprising, in combination, an elongated bed, an upstanding column on said bed, a saddle unit slidable longitudinally on said bed, a table unit slidable on said saddle transversely of said bed, a spindle headstock unit slidable vertically on said column, three transmissions operatively connected respectively to said units and each having a terminal power inlet shaft, two reversible electric drive motors mounted on said bed and being selectively adjustable in speed over a predetermined range, two adjustable high and low speed mechanisms connected respectively to said motors and having outlet power shafts, each speed mechanism being adjustable to provide a total speed range which is greater than the motor speed range, shiftable gear means for connecting one of said power shafts selectively to said terminal shafts for said saddle and table units and the other of said power shafts selectively to said terminal shafts for said table and headstock units, whereby said units may be translated independently in direction and speed and either individually or in any combination of two, and interlock means for preventing simultaneous connection of said speed mechanisms to said terminal shaft for said table unit.

5. A boring machine comprising, in combination, a support, a machine unit reversibly movable on said support, a reversible drive motor adjustable in speed over a predetermined range, a drive transmission including an adjustable speed mechanism for connecting said motor to said unit to translate said unit, means for effecting reversal of said motor to reverse the direction of translation of said unit, means for adjusting said speed mechanism, and means for adjusting the speed of said motor for any adjustment of said mechanism whereby to translate said unit at any speed over a range which is a multiple of the speed range of said motor.

6. A machine comprising, in combination, a support, a machine unit reversibly movable on said support, a reversible electric drive motor adjustable in speed over a predetermined range, a drive transmission including an adjustable two-speed mechanism for connecting said motor to said unit to translate said unit, means for effecting reversal of said motor to reverse the direction of translation of said unit, means for adjusting said speed mechanism, the ratio of adjustment of said mechanism corresponding substantially to that portion of the speed range of said motor utilized for the high speed adjustment of said mechanism, and electronic control means for adjusting the speed of said motor for any adjustment of said mechanism, whereby to translate said unit at any speed over a range which is a multiple of the speed range of said motor.

7. A machine comprising, in combination, a support, a machine unit reversibly movable on said support, a reversible electric drive motor adjustable in speed over a predetermined finely-graduated range, a drive transmission including an adjustable high and low speed range mechanism for connecting said motor to said unit to translate said unit, electric control means for effecting reversal of said motor to reverse the direction of translation of said unit, hydraulic means for adjusting said speed mechanism, and electronic control means for adjusting the speed of said motor for either adjustment of said mechanism, whereby to translate said unit at any speed over a total speed gradient comprising high and low speed ranges.

8. A machine comprising, in combination, a support, a machine unit reversibly movable on said support, a reversible electric drive motor adjustable in speed over a predetermined finely-graduated range, a drive transmission including an adjustable high and low speed range mechanism for connecting said motor to said unit to translate said unit, a pendant control panel adapted to be grasped in the hands of the operator, remote control means including control elements on said panel for starting and stopping said motor and for inching said motor, remote control means including a control element on said panel for effecting reversal of said motor to reverse the direction of translation of said unit, electronic control means including a potentiometer in said panel and with an adjusting knob on one side of said panel for adjusting the speed of said motor for either range adjustment of said mechanism, hydraulic means for adjusting said mechanism, electric control means for said hydraulic means and including a range selector switch operable by said potentiometer after a predetermined rotation of said knob in either direction, whereby to translate said unit at any speed over a range which is greater than the speed range of said motor.

9. A machine comprising, in combination, a support, a machine unit reversibly movable on said support, a reversible electric drive motor adjustable in speed over a predetermined range, a drive transmission including a separable connection and an adjustable speed range mechanism for connecting said motor to said unit to translate said unit, means for effecting reversal of said motor to reverse the direction of translation of said unit, means for adjusting the speed of said motor including a potentiometer having an adjusting knob, and means for adjusting said speed mechanism including an electric switch operable upon adjustment of said potentiometer in either direction over the full motor speed range.

10. A machine comprising, in combination, a support, a machine unit reversibly movable on said support, a reversible electric drive motor adjustable in speed over a predetermined range, a drive transmission including a separable connection and an adjustable speed range mechanism for connecting said motor to said unit to translate said unit, means for effecting reversal of said motor to reverse the direction of translation of said unit, means for adjusting the speed of said motor including a potentiometer having an adjusting knob rotatable through approximately one revolution or less to adjust said potentiometer through two revolutions with each revolution of said potentiometer covering the full motor speed range, and means for adjusting said speed mechanism including a reversible electric range selector switch operable by rotation of said potentiometer substantially at the midpoint of its range of movement.

11. A boring machine comprising, in combination, a support, a plurality of machine units mounted for independent and reversible translation on said support, a plurality of reversible variable speed drive motors, a plurality of drive transmissions operatively connected respectively to said units and having terminal power inlet shafts, a plurality of adjustable speed mechanisms connected respectively to said motors and having outlet power shafts, each mechanism having high and low speed adjustments of a ratio corresponding to that portion of the speed range of the associated motor utilized during high speed adjustment of said mechanism, and selective coupling means for disengageably connecting said power shafts individually to said respective terminal shafts, whereby to drive said units individually or in various combinations and independently in direction and rate of speed.

12. A boring machine comprising, in combination, a support, a machine unit mounted for reversible translation on said support, a plurality of reversible variable speed drive motors, a drive transmission operatively connected to said unit and having a terminal power inlet shaft, a plurality of adjustable speed mechanisms connected respectively to said motors and having outlet power shafts, each mechanism having high and low speed adjustments of a ratio corresponding to the utilized speed range of the associated motor, selective coupling means for connecting either of said power shafts individually to said terminal shaft, and interlock means for preventing connection of said mechanisms simultaneously to said terminal shaft.

13. A boring machine comprising, in combination, a support, a machine unit mounted for reversible translation on said support, a plurality of reversible variable speed drive motors, a drive transmission operatively connected to said unit and having a terminal power inlet shaft, a plurality of adjustable speed mechanisms connected respectively to said motors and having outlet power shafts, each mechanism having high and low speed adjustments of a ratio corresponding to the speed range of the associated motor, first and second coupling means including parallel operating shafts for connecting said power shafts respectively to said terminal shaft, a housing for said shafts, two interlock rods slidable in end-to-end relation in said housing and respectively carrying two dogs, two rotary cams respectively fixed on said shafts and coacting respectively with said dogs, whereby upon rotation of either operating shaft in a direction to connect the associated power shaft to said terminal shaft the associated rod is actuated to block the other rod against movement in a direction to connect the other power shaft to said terminal shaft.

14. A machine comprising, in combination, a support, a machine unit reversibly movable on said support and carrying a rotatable spindle, a spindle motor for driving said spindle, a reversible feed motor adjustable in speed over a predetermined range, a drive transmission including an adjustable speed mechanism for connecting said feed motor to said unit to translate said unit, means for effecting reversal of said motor to reverse the direction of translation of said unit, hydraulic means for adjusting said speed mechanism, an oil pump forming part of said hydraulic means, an oil pump motor for driving said pump, means for adjusting the speed of said feed motor, interlock means for preventing operation of said spindle motor unless the oil pump motor is operating, and interlock means for preventing operation of said feed motor unless said spindle motor is in operation.

15. A machine comprising, in combination, a support, two machine units mounted for independent and reversible translation on said support, a reversible variable speed electric drive motor, a plurality of drive transmissions operatively connected respectively to said units and having terminal power inlet shafts, an adjustable speed mechanism connected to said motor and having an outlet power shaft, start, stop and reversing control circuits for said motor, coupling means including an operating element for connecting said power shaft selectively to one or the other of said terminal shafts, two sets of limit switches included in said circuits respectively operable by said units to limit the movements thereof in opposite directions, and bypass limit switches operable by said element to shunt the set of said first mentioned limit switches associated with the unit disconnected from said power shaft while conditioning the other set of switches for operation.

16. A machine comprising, in combination, a support, two machine units mounted for independent and reversible translation on said support, a reversible variable speed drive motor, two drive transmissions operatively connected respectively to said units and having terminal power inlet shafts, an adjustable speed mechanism connected to said motor and having an outlet power shaft, said mechanism having high and low speed adjustments of a ratio so related to the speed range of said motor that the progressive sequence of feed changes is uninterrupted in proceeding from one adjustment of said mechanism to the other, and selective coupling means for connecting said power shaft individually to one or the other of said respective terminal shafts.

17. A machine comprising, in combination, a support, a machine unit reversibly movable on said support, a variable-speed reversible electric drive motor, and a drive transmission for connecting said motor to said unit to translate the latter and including a high and low speed mechanism, said mechanism comprising parallel high and low speed gear drives, a double clutch having a clutch element shiftable in opposite directions to connect one or the other said said drives in said transmission, a reciprocable hydraulic actuator connected to said element, a source of fluid under pressure, and a solenoid valve normally biased into one position to connect said source to one side of said actuator and operable upon being energized to shift into another position to connect said source to the other side of said actuator.

18. A machine comprising, in combination, a support, two machine units mounted for independent and reversible transmission on said support, two reversible variable speed drives adapted for connection respectively to said units and each including a variable speed reversible electric motor, a pendant control panel adapted to be grasped in the hands of the machine operator, and electronic speed control circuits for said motors, each circuit including a potentiometer having an operating element and being adjustable to vary the motor speed, said potentiometers for said two motors being mounted within said panel and having their respective operating elements projecting from opposite sides of said panel.

19. A machine comprising, in combination, a support, two machine units mounted for independent and reversible transmission on said support, two reversible variable speed drives adapted for connection respectively to said units and each including a variable speed reversible electric motor, a pendant control panel adapted to be grasped in the hands of the machine operator, and electronic speed control circuits for said motors, each circuit including a potentiometer having an operating element and being adjustable to vary the motor speed, said potentiometers for said two motors being mounted within said panel and having their respective operating elements projecting from opposite sides of said panel, two adjustable two-speed mechanisms included respectively in said drives, operating means for said mechanisms and including electric control circuits with speed selector switches mounted in said panel for operation respectively by said potentiometers.

20. In a drive for reversibly translating two movable machine units, in combination, two reversible variable speed drives adapted for connection respectively to said units and each including a variable speed reversible electric motor, a pendant control panel adapted to be grasped in the hands of a machine operator, and electronic speed control circuits for said motors, each circuit including a potentiometer having an operating element and being adjustable to vary the motor speed, said potentiometers for said motors being mounted within said panel and having their respective operating elements projecting from opposite sides of said panel.

KEITH F. GALLIMORE.

REFERENCES CITED

The following references are of record in the file of this patent:

UNITED STATES PATENTS

| Number | Name | Date |
|---|---|---|
| 1,858,491 | Gallimore | May 17, 1932 |
| 2,350,174 | Lucas et al. | May 30, 1944 |
| 2,224,108 | Ridgway | Dec. 3, 1940 |